(12) United States Patent
Vermillion (10) Patent No.: US 6,683,558 B1
(45) Date of Patent: Jan. 27, 2004

(54) SPEED MEASUREMENT DEVICE WITH STATISTIC GATHERING CAPABILITY

(75) Inventor: Jordan Vermillion, Overland Park, KS (US)

(73) Assignee: Bushnell Performance Optics, Overland Park, KS (US)

( * ) Notice: Subject to any disclaimer, the term of this patent is extended or adjusted under 35 U.S.C. 154(b) by 0 days.

(21) Appl. No.: 10/214,492

(22) Filed: Aug. 6, 2002

(51) Int. Cl.[7] .................. G01S 13/08; G01P 3/42; A63B 69/00
(52) U.S. Cl. .................. 342/104; 324/160; 473/422
(58) Field of Search .................. 342/104–117; 324/160–180; 473/422; 702/142, 143

(56) References Cited

U.S. PATENT DOCUMENTS

| | | | | |
|---|---|---|---|---|
| 4,276,548 A | * | 6/1981 | Lutz | 342/103 |
| 4,858,922 A | * | 8/1989 | Santavaci | 473/192 |
| 5,064,194 A | * | 11/1991 | Bixler et al. | 473/436 |
| 5,199,705 A | * | 4/1993 | Jenkins et al. | 473/415 |
| 5,419,549 A | * | 5/1995 | Galloway et al. | 473/431 |
| 5,521,696 A | * | 5/1996 | Dunne | 356/5.07 |
| 5,528,246 A | | 6/1996 | Henderson et al. | |
| 5,570,093 A | | 10/1996 | Aker et al. | |
| 5,793,491 A | * | 8/1998 | Wangler et al. | 356/613 |
| 5,912,822 A | * | 6/1999 | Davis et al. | 702/143 |
| 6,091,355 A | * | 7/2000 | Cadotte et al. | 342/104 |
| 6,121,898 A | * | 9/2000 | Moetteli | 340/933 |
| 6,198,427 B1 | | 3/2001 | Aker et al. | |
| 2002/0193938 A1 | * | 12/2002 | DeKock et al. | 701/117 |

* cited by examiner

*Primary Examiner*—Thomas H. Tarcza
*Assistant Examiner*—Brian Andrea
(74) *Attorney, Agent, or Firm*—Hovey Williams LLP (57) ABSTRACT

A radar speed measurement device (10) comprising a display (12) for displaying a target speed, a radar emitter (14) for emitting radar waves toward a target, a radar receiver (16) for receiving radar waves reflected from the target, an analog to digital converter (18) for producing digital signals associated with the radar waves, and a signal processor (20) for determining the target speed by analyzing the digital signals. The device (10) can also calculate statistics associated with the target and further comprises a statistical processor (22) for calculating the statistics. The device (10) can operate in either of two modes. A speed mode is preferably used to determine the target speed, when the target is a race car or any other object. A baseball statistics mode is preferably used to determine the target speed, when the target is a baseball thrown by a pitcher.

21 Claims, 6 Drawing Sheets

SPEED MEASUREMENT DEVICE WITH STATISTIC GATHERING CAPABILITY

BACKGROUND OF THE INVENTION

1. Field of the Invention

The present invention relates to speed measurement devices. More particularly, the present invention relates to a radar speed measurement device that can calculate and store statistical information.

2. Description of Prior Art

Most radar speed measurement devices are designed to be used by law enforcement officers to determine vehicle speeds in an effort to monitor traffic flow and enforce traffic laws. Sports enthusiasts often wish to use these devices at sporting events to track the speed of thrown or hit balls, but devices designed for use by law enforcement officers are typically not well suited for use at sporting events, for a number of reasons. First, speed measuring devices designed for use by law enforcement purposes are typically bulky and may require external power sources. Second, these devices are specifically designed to detect the speed of large vehicles and may not be able to efficiently detect the speed of small objects, such as baseballs.

In recent years, speed measurement devices have been modified to be more useful at sporting events allowing them to detect the speed of baseballs; however, they are not capable of collecting statistics. Statistics, such as average speeds, pitch counts, as well as ball and strike totals are often collected by talent scouts, sports fans, and others. Therefore, people wishing to both detect the speed of balls and collect statistics are currently forced to use both a speed measurement device and some other means to collect statistics.

Accordingly, there is a need for an improved speed measurement device that overcomes the limitations of the prior art.

SUMMARY OF THE INVENTION

The present invention overcomes the above-identified problems and provides a distinct advance in the art of speed measurement devices. More particularly, the present invention provides a radar speed measurement device that can detect the speed of a thrown or hit object such as a baseball and calculate and store statistical information. The device uses radar to measure speed by emitting radar waves at a target. As the radar waves are reflected by the target, they undergo a frequency shift. This phenomenon is commonly known as a Doppler Shift. The magnitude of the Doppler Shift can be used to calculate a target speed, which is the speed of the target, relative to the device.

The device broadly comprises a radar emitter for emitting emitted radar waves toward the target, a radar receiver for receiving received radar waves reflected from the target, an analog to digital converter for producing digital signals associated with the radar waves, a signal processor for determining the target speed by analyzing the digital signals, and a display for displaying the target speed. In accordance with an important aspect of the present invention, the device can also calculate and store statistics associated with the target and further comprises a statistical processor for calculating the statistics, a memory for storing the statistics, several buttons for controlling the functionality of the device, and a housing for containing and protecting the device.

The device can preferably be configured to operate in either of two modes. A speed mode is preferably used to determine the target speed, when the target is a race car or any other object. In the speed mode, the statistical processor preferably calculates generic statistics, such as a last speed and an average speed.

A baseball statistics mode is preferably used to determine the target speed, when the target is a baseball or other object thrown by a pitcher or other person. In the baseball statistics mode, the statistical processor preferably calculates a number of pitches, a number of balls, and a number of strikes, in addition to the last speed and the average speed. Furthermore, the device can track statistics separately for more than one pitcher. For example, the device can independently track the number of pitches, the number of balls, and the number of strikes for up to eight different pitchers.

The display is preferably mounted to a rear panel of the housing and displays the target speed and the statistics. Additionally, the display may be used to display mode information in order to assist a user in selecting one of the modes described above. The display is preferably a liquid crystal display approximately one and five eighths inches wide and approximately seven eights of an inch tall.

The radar emitter and the radar receiver are preferably mounted behind a front panel of the housing. This configuration allows the user to direct the emitted radar waves toward and receive the received radar waves reflected from the target by pointing the device at the target. The radar emitter and the radar receiver are preferably electrically coupled allowing the radar receiver to detect the Doppler Shift and generate analog signals representative of the Doppler Shift.

The analog to digital converter receives the analog signals from the radar receiver and transforms them into digital signals which are transferred to the signal processor. The signal processor receives and analyzes the digital signals to determine the target speed. For example, the signal processor performs Fast Fourier Transform calculations on the digital signals and thereby determines the target speed.

The statistical processor receives the target speed from the signal processor and uses the target speed to calculate the average speed. The statistical processor also stores a proceeding target speed as the last speed. Additionally, the statistical processor increments the number of pitches each time a new target speed is received from the signal processor. Furthermore, the statistical processor increments the number of balls and the number of strikes according to input received from the user through the buttons, as described below. Finally, the statistical processor stores the statistics in the memory.

The buttons comprise a power button for turning the device on and off, a trigger for initiating measurement of the target speed, a page button for allowing the user to select one of the modes, an enter button for allowing the target speed to be used in calculating the statistics and incrementing the pitch count, a down button for incrementing the number of balls, and an up button for incrementing the number of strikes. When the trigger is depressed, the radar emitter begins emitting the emitted radar waves and the signal processor continually updates the target speed, which is continually displayed on the display. When the trigger is released, the radar emitter stops emitting the emitted radar waves and the signal processor locks onto a most recent target speed, which is displayed on the display.

In use, the user may measure the target speed in the speed mode by first depressing and releasing the power button in order to turn on the device. The user points the device at the target. The user causes the signal processor to calculate the target speed by depressing the trigger. The user may see the target speed displayed on the display. The user causes the device to lock onto the target speed by releasing the trigger. If the user would like the device to calculate the statistics using the target speed, then the user depresses and releases the enter button. As soon as the enter button is depressed, the statistical processor updates both the last speed and the average speed.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
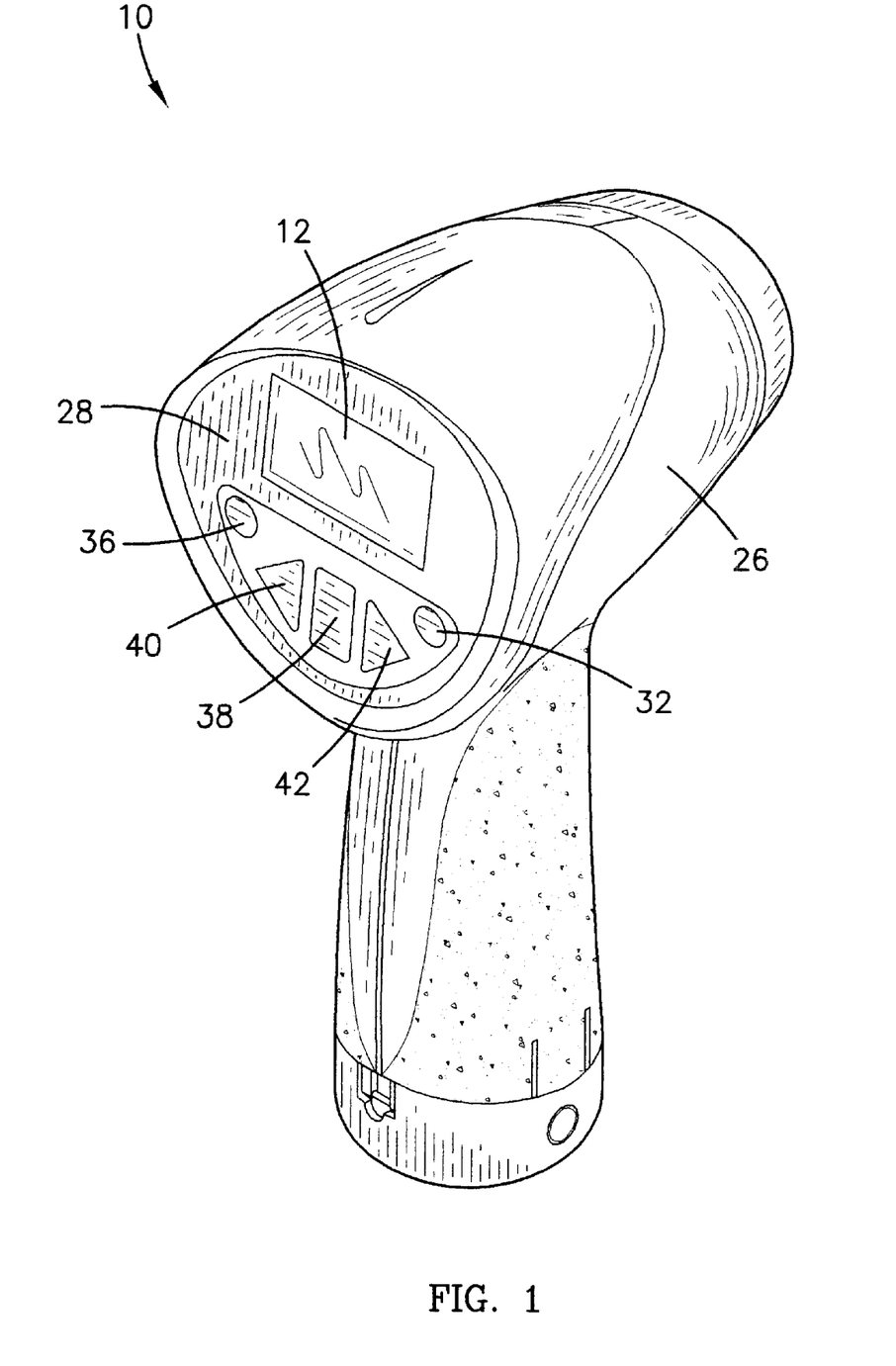
FIG. 1 is a perspective view of a radar speed measurement device that can calculate and store statistical information constructed in accordance with a preferred embodiment of the present invention.
Figure 2:
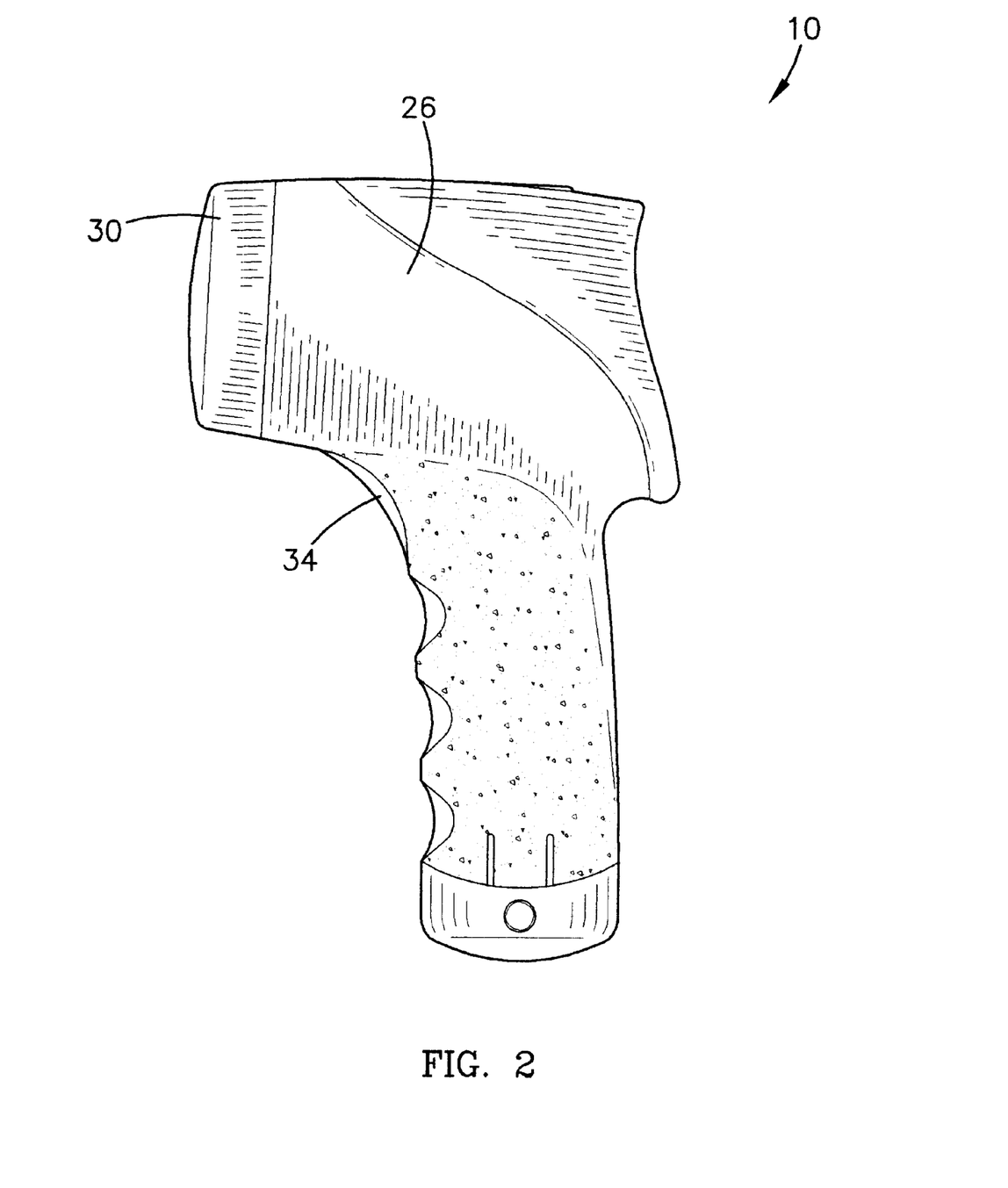
FIG. 2 is a side elevation view of the device.
Figure 3:
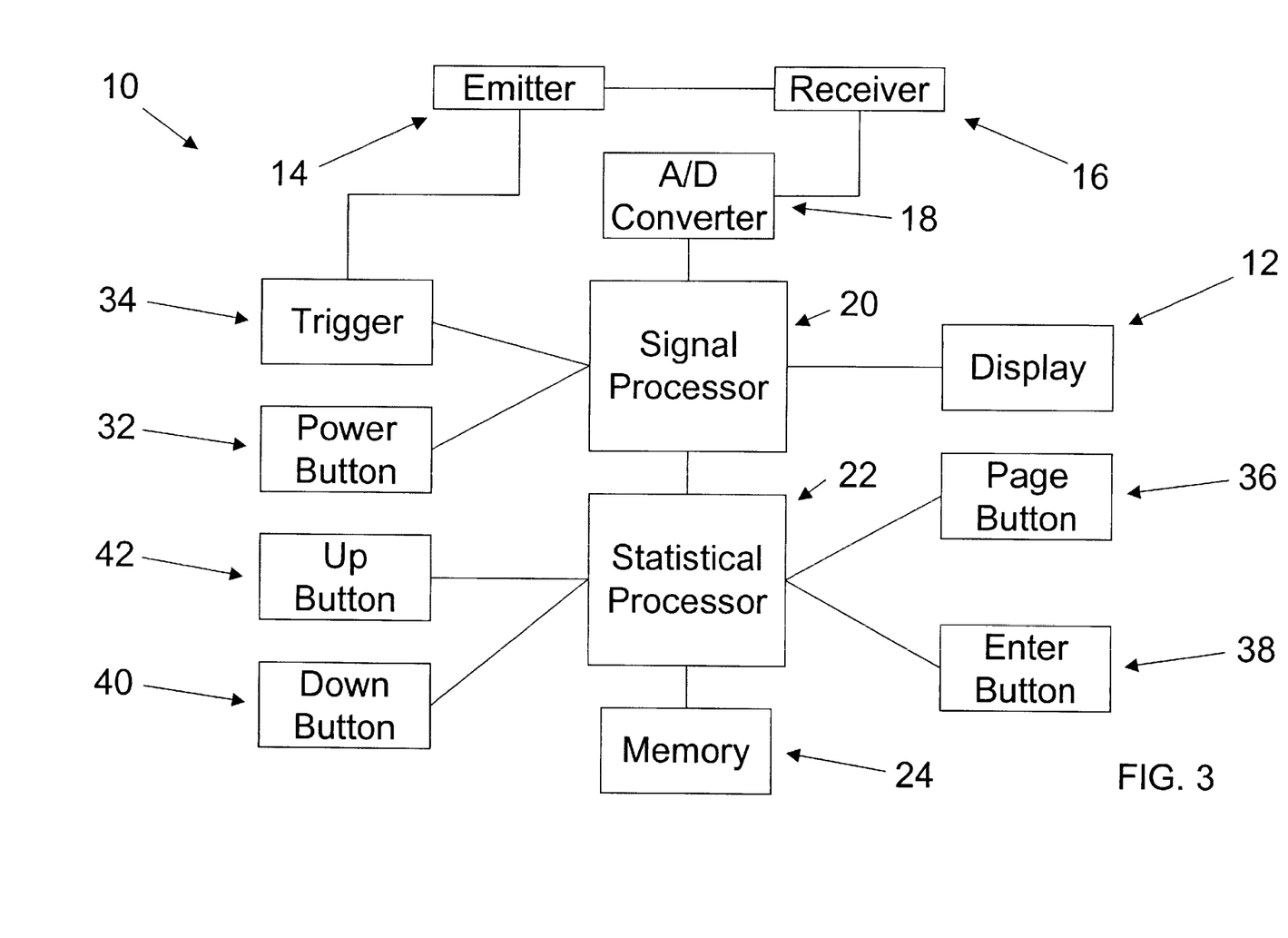
FIG. 3 is a block diagram of the device.

Referring to FIGS. 1–3, a radar speed measurement device 10 is shown constructed in accordance with a preferred embodiment of the present invention. The device 10 uses radar to measure speed by emitting radar waves at a target, such as a baseball, a softball, a football, or other object. As the radar waves are reflected by the target, they undergo a frequency shift. This phenomenon is commonly known as a Doppler Shift. The magnitude of the Doppler Shift can be used to calculate a target speed, which is the speed of the target, relative to the device 10.

The device 10 emits emitted radar waves at a specific emission frequency and receives received radar waves at a slightly different reception frequency, depending upon the target speed. The emission frequency is preferably between 20 Giga-Hertz and 40 Giga-Hertz, commonly known as a K-band. For example, the emission frequency may be 24.125 Giga-hertz or 24.150 Giga-Hertz.

The device 10 broadly comprises a radar emitter 14 for emitting the emitted radar waves toward the target, a radar receiver 16 for receiving the received radar waves reflected from the target, an analog to digital converter 18 for producing digital signals associated with the radar waves, a signal processor 20 for determining the target speed by analyzing the digital signals, and a display 12 for displaying the target speed. The device 10 can also calculate and store statistics associated with the target and further comprises a statistical processor 22 for calculating the statistics, a memory 24 for storing the statistics, several buttons for controlling the functionality of the device 10, and a housing 26 for containing and protecting the device 10.

The device 10 may preferably calculate and display the target speed in either miles per hour (MPH) or kilometers per hour (KPH). MPH is a unit of speed used throughout the Unites States, while KPH is another unit of speed used throughout the rest of the World.

The device 10 can preferably be configured to operate in either of two modes. A speed mode is preferably used to determine the target speed, when the target is a race car or any other object. In the speed mode, the statistical processor 22 preferably calculates generic statistics, such as a last speed and an average speed.

A baseball statistics mode is preferably used to determine the target speed, when the target is a baseball thrown by a pitcher. In the baseball statistics mode, the statistical processor 22 preferably calculates a number of pitches, a number of balls, and a number of strikes, in addition to the last speed and the average speed. Furthermore, the device 10 can track statistics separately for more than one pitcher. For example, the device 10 can independently track the number of pitches, the number of balls, and the number of strikes for up to eight different pitchers.

The display 12 is preferably mounted to a rear panel 28 of the housing 26 and may be used to display the target speed and the statistics. Additionally, the display 12 may be used to display mode information in order to assist a user in electing one of the modes described above. The display 12 is preferably a liquid crystal display approximately one and five eighths inches wide and approximately seven eights of an inch tall.

The radar emitter 14 and the radar receiver 16 are preferably mounted behind a front panel 30 of the housing 26. This configuration allows the user to direct the emitted radar waves toward and receive the received radar waves reflected from the target by pointing the device 10 at the target. The radar emitter 14 and the radar receiver 16 are preferably electrically coupled allowing the radar receiver 16 to detect the Doppler Shift and generate analog signals representative of the Doppler Shift.

Additionally, a radar concentrator is preferably mounted in front of the radar emitter 14 and the radar receiver 16 and behind the front panel 30. The radar concentrator acts to concentrate the emitted radar waves into a beam and direct them toward the target. The radar concentrator also acts to concentrate the received radar waves reflected from the target and direct them toward the radar receiver 16. Thus, the radar concentrator improves the efficiency of the device 10 by concentrating both the emitted radar waves and the received radar waves such that the device 10 may produce better results using less power.

The analog to digital converter 18 receives the analog signals from the radar receiver 16 and transforms them into digital signals which are transferred to the signal processor 20. The signal processor 20 receives and analyzes the digital signals to determine the target speed. For example, the signal processor 20 performs Fast Fourier Transform calculations on the digital signals and thereby determines the target speed.

The statistical processor 22 receives the target speed from the signal processor 20 and uses the target speed to calculate the average speed. The statistical processor 22 also stores a proceeding target speed as the last speed. Additionally, the statistical processor 22 increments the number of pitches each time a new target speed is received from the signal processor 20. Furthermore, the statistical processor 22 increments the number of balls and the number of strikes according to input received from the user through the buttons, as described below. Finally, the statistical processor 22 stores the statistics in the memory 24.

The buttons comprise a power button 32 for turning the device on and off, a trigger 34 for initiating measurement of the target speed, a page button 36 for allowing the user to select one of the modes, an enter button 38 for allowing the target speed to be used in calculating the statistics and incrementing the pitch count, a down button 40 for incrementing the number of balls, and an up button 42 for incrementing the number of strikes. When the trigger 34 is depressed, the radar emitter 14 begins emitting the emitted radar waves and the signal processor 20 continually updates the target speed, which is continually displayed on the display 12. When the trigger 34 is released, the radar emitter 14 stops emitting the emitted radar waves and the signal processor 20 locks onto a most recent target speed, which is displayed on the display 12.

Each time the page button 36 is depressed, the display 12 cycles through a plurality of screens, depending upon which mode is selected. If the speed mode is selected, then the display 12 cycles between a setup screen and a basic speed screen. If the baseball statistics mode is selected, then the display 12 cycles between the setup screen, an advanced speed screen, and a player edit screen.

The setup screen allows the user to clear the memory, select one of the two modes, and select whether the target speed should be calculated and displayed in MPH or KPH. The basic speed screen is preferably used with the speed mode and displays the target speed, the last speed, and the average speed. The advanced speed screen is preferably used with the baseball statistics mode and displays a selected pitcher, the target speed, the last speed, the average speed, the number of pitches, the number of balls, and the number of strikes for the selected pitcher. The player edit screen allows the user to select the pitcher for which to calculate and display statistics. The player edit screen also allows the user to edit the number of balls and the number of strikes.

The enter button 38 may also be used to accept settings as currently displayed on the display 12 and select one of a plurality of settings to modify. The down button 40 and the up button 42 may also be used to navigate between the settings and modify the settings.

While the signal processor 20 and the statistical processor 22 have been described as separate elements, they both may be embodied in one processor. For example, a single master processor may be used to accomplish the functionality of both the signal processor 20 and the statistical processor 22.

While the present invention has been described above, it is understood that the baseball statistics mode, as described above, could also be used for softball. Additionally, the statistical processor 22 may be modified to calculate and store statistics associated with other sports. Furthermore, the device 10 may be modified to use another common radar speed measurement technique. These and other minor modifications are within the scope of the present invention.

Figure 4:
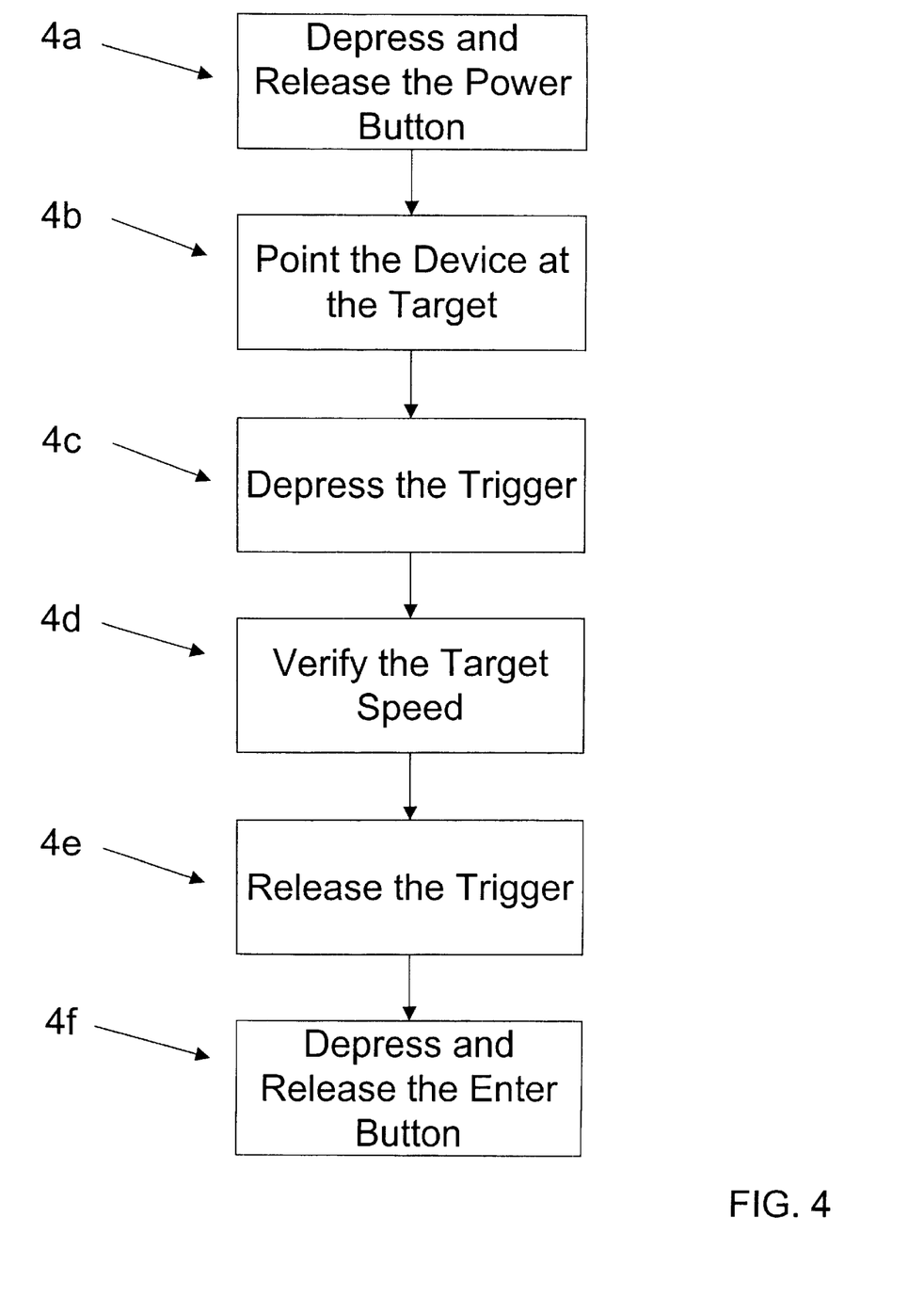
FIG. 4 is a flow chart showing a method of measuring a target speed with the device in a speed mode.

Referring to FIG. 4, the user may measure the target speed in the speed mode by first depressing and releasing the power button 32 in order to turn on the device 10, as depicted in step 4a. The user points the device 10 at the target, as depicted in step 4b. The user causes the signal processor 20 to calculate the target speed by depressing the trigger 34, as depicted in step 4c. The user may see the target speed displayed on the display 12, as depicted in step 4d. The user causes the device 10 to lock onto the target speed by releasing the trigger 34, as depicted in step 4e. If the user would like the device 10 to calculate the statistics using the target speed, then the user depresses and releases the enter button 38, as depicted in step 4f. As soon as the enter button 38 is depressed, the statistical processor 22 updates both the last speed and the average speed.

Figure 5:
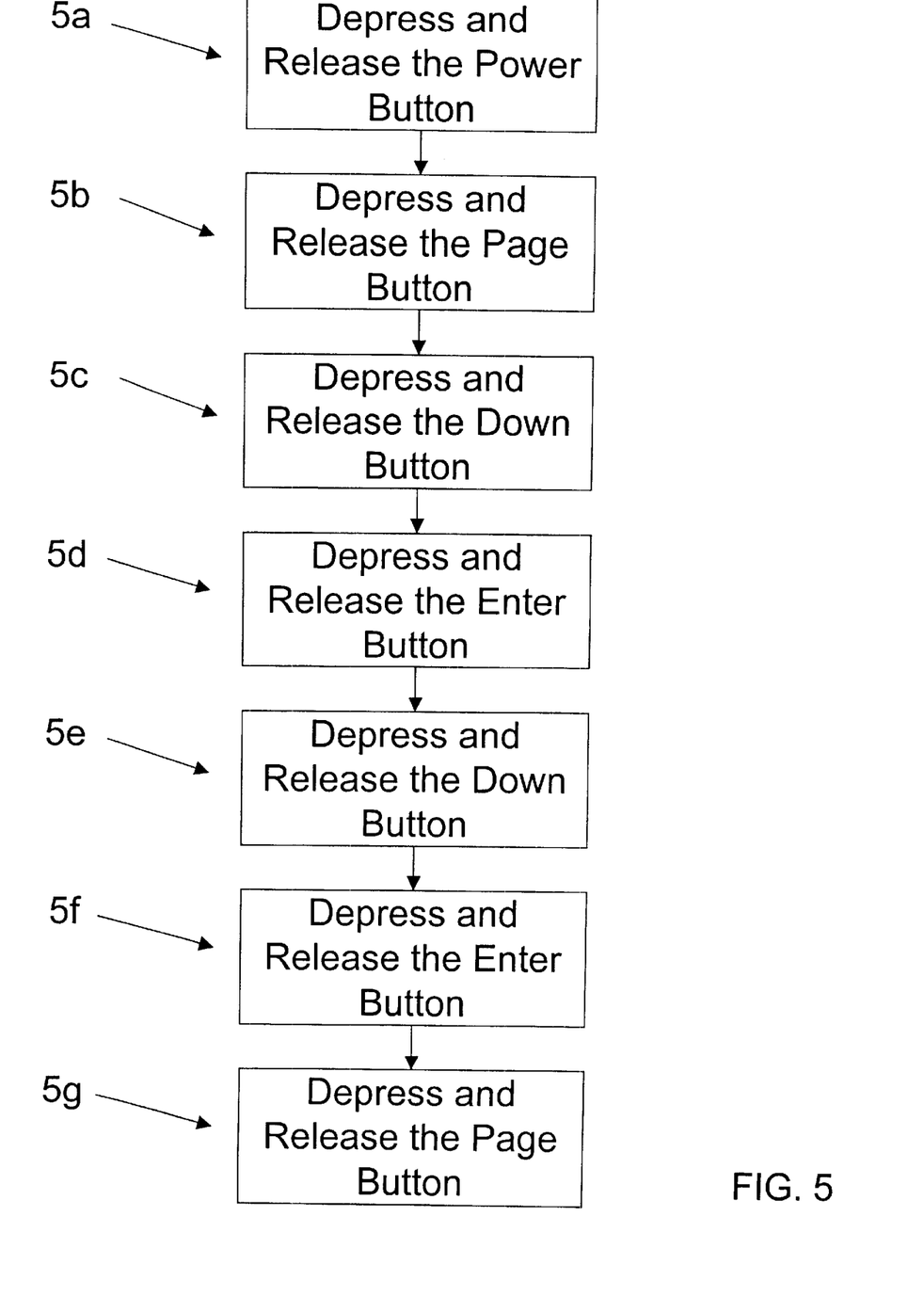
FIG. 5 is a flow chart showing a method of configuring the device by selecting one of two modes of operation.

Referring the FIG. 5, the user may select one of the modes by first depressing and releasing the power button 32 in order to turn on the device 10, as depicted in step 5a. The user selects the setup screen by depressing and releasing the page button 36, as depicted in step 5b. The user depresses and releases the down button 40 until "mode" is highlighted, as depicted in step 5c. The user instructs the device 10 that he or she would like to select one of the modes by depressing and releasing the enter button 38, as depicted in step 5d. The user may depress and release either the down button 40 or the up button 42 until the mode he or she desires is shown, as depicted in step 5e. Once the mode the user desires is displayed, he or she depresses and releases the enter button 38, as depicted in step 5f. The user may resume measuring the target speed by depressing and releasing the page button 36, as depicted in step 5g.

Figure 6:
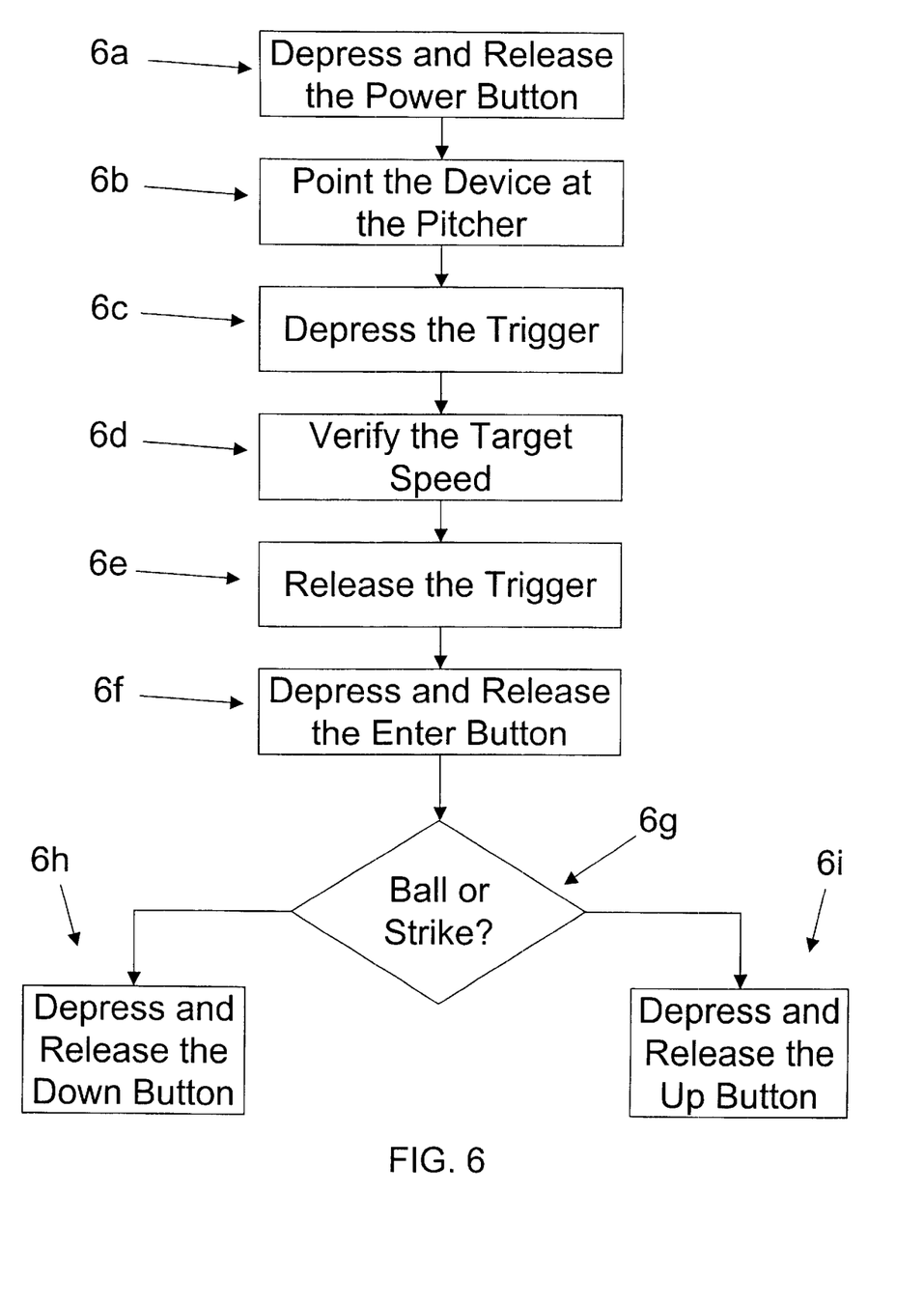
FIG. 6 is a flow chart showing a method of measuring the target speed with the device in a baseball statistics mode.

Referring to FIG. 6, the user may measure the target speed in the baseball statistics mode by first depressing and releasing the power button 32 in order to turn on the device 10, as depicted in step 6a. The user points the device at the pitcher, as depicted in step 6b. The user causes the signal processor 20 to calculate the target speed by depressing the trigger 34 as the pitcher releases the baseball, as depicted in step 6c. The user may see the target speed displayed on the display 12, as depicted in step 6d. The user causes the device 10 to lock onto the target speed by releasing the trigger 34, as depicted in step 6e.

If the user would like the device 10 to calculate the statistics using the target speed, the user depresses and releases the enter button 38, as depicted in step 6f. As soon as the enter button 38 is depressed, the statistical processor 22 updates the last speed, the average speed, and the pitch count. The user must then decide whether the pitcher has thrown a ball or a strike, as depicted in step 6g. If the pitcher has thrown a ball, then the user causes the statistical processor 22 to increment the number of balls by depressing and releasing the down button 40, as depicted in step 6h. If the pitcher has thrown a strike, then the user causes the statistical processor 22 to increment the number of strikes by depressing and releasing the up button 42, as depicted in step 6i.

Having thus described a preferred embodiment of the invention, what is claimed as new and desired to be protected by letters patent includes the following:

1. A radar speed measurement device that can calculate and store statistical information, the device comprising:
   a handheld housing;
   a radar emitter mounted within the housing and operable to emit emitted radar waves toward a target;
   a radar receiver mounted within the housing and operable to receive received radar waves that have been reflected from the target;
   a signal processor mounted within the housing and operable to perform calculations based upon changes in the radar waves thereby determining a target speed; and
   a statistical processor mounted within the housing and operable to calculate statistics associated with the target.

2. The device as set forth in claim 1, wherein the statistics are selected from the group consisting of: a last speed and an average speed of the target.

3. The device as set forth in claim 1, further including a button operable to cause the statistical processor to calculate the statistics using the target speed.

4. The device as set forth in claim 1, wherein the signal processor and the statistical processor are part of a single master processor.

5. The device as set forth in claim 1, further including a trigger operable to cause the emitter to emit the emitted radar waves when the trigger is activated.

6. The device as set forth in claim 5, wherein the trigger is further operable to cause the emitter to stop emitting the emitted radar waves when the trigger is deactivated.

7. The device as set forth in claim 5, wherein the trigger is further operable to cause the device to lock onto the target speed when the trigger is deactivated.

8. The device as set forth in claim 1, wherein the statistics are selected from the group consisting of: a pitch count, a number of balls, and a number of strikes.

9. The device as set forth in claim 8, further including a button operable to cause the statistical processor to increment the number of balls.

10. The device as set forth in claim 8, further including a button operable to cause the statistical processor to increment the number of strikes.

11. The device as set forth in claim 8, further including a button operable to cause the statistical processor to increment the pitch count.

12. The device as set forth in claim 8, further including a memory operable to store the statistics for more than one player.

13. A speed measuring device using radar that can calculate and store statistical information, the device comprising:

a trigger operable to cause a radar emitter to emit emitted radar waves and a radar receiver to receive received radar waves that have been reflected from a target when the trigger is activated, wherein the trigger is further operable to cause the emitter to stop emitting the emitted radar waves and cause the device to lock onto a target speed when the trigger is deactivated;

a signal processor operable to perform calculations based upon changes in the radar waves thereby determining the target speed;

a statistical processor operable to calculate statistics associated with the target, wherein the statistics include a last speed and an average speed; and an enter button operable to cause the statistical processor to calculate the statistics using the target speed.

14. The device as set forth in claim 13, wherein the signal processor and the statistical processor are part of a single master processor.

15. The device as set forth in claim 13, wherein the statistics further include a pitch count, a number of balls, and a number of strikes.

16. The device as set forth in claim 15, further including another button operable to cause the statistical processor to increment the number of balls.

17. The device as set forth in claim 15, further including another button operable to cause the statistical processor to increment the number of strikes.

18. The device as set forth in claim 15, wherein the enter button is further operable to increment the pitch count.

19. The device as set forth in claim 15, further including a memory operable to store at least some of the statistics for more than one player.

20. A radar speed measurement device that can calculate and store statistical information, the device comprising:

a display operable to display a target speed;

a trigger operable to cause a radar emitter to emit emitted radar waves, cause a radar receiver to receive received radar waves that have been reflected from a target, and cause the display to display the target speed when the trigger is activated, wherein the trigger is further operable to cause the emitter to stop emitting the emitted radar waves and cause the device to lock onto the target speed when the trigger is deactivated;

a processor operable to perform calculations based upon changes in the radar waves thereby determining the target speed and calculate statistics associated with the target, wherein the statistics include a last speed, an average speed a pitch count, a number of balls, and a number of strikes;

a memory operable to store at least some of the statistics for more than one player;

a first button operable to cause the processor to calculate the statistics using the target speed and increment the pitch count;

a second button operable to cause the processor to increment the number of balls; and a third button operable to cause the processor to increment the number of strikes.

21. A radar speed measurement device that can calculate and store statistical information, the device comprising:

a radar emitter operable to emit emitted radar waves toward a target, a radar receiver operable to receive received radar waves that have been reflected from the target;

a signal processor operable to perform calculations based upon changes in the radar waves thereby determining a target speed;

a statistical processor operable to calculate statistics associated with the target; and a trigger operable to cause the emitter to emit the emitted radar waves when the trigger is activated and cause the device to lock onto the target speed when the trigger is deactivated.

* * * * *